Sept. 14, 1965

M. MARKARIAN 3,206,658

SOLID ELECTROLYTE CAPACITOR WITH
SURFACE-CONTACTING CATHODE LEAD

Filed Dec. 7, 1959

*INVENTOR.*
MOUSHY MARKARIAN
BY Connolly and Hutz
HIS ATTORNEYS

United States Patent Office 3,206,658
Patented Sept. 14, 1965

3,206,658
SOLID ELECTROLYTE CAPACITOR WITH
SURFACE-CONTACTING CATHODE LEAD
Moushy Markarian, Williamstown, Mass., assignor to
Sprague Electric Company, North Adams, Mass., a
corporation of Massachusetts
Filed Dec. 7, 1959, Ser. No. 857,841
2 Claims. (Cl. 317—230)

This invention relates to a solid electrolyte capacitor assembly, and more particularly to the cathode contact of a solid electrolyte capacitor, and still more particularly to the containment of lead-wires in connection with the cathode of a solid electrolyte capacitor.

Solid electrolyte capacitors are composed of a number of elements including lead-wires and electrodes that are assembled into the completed component. Lead-wires must be attached into the assembled component in such manner as to make permanent and secure contact with the electrodes of the capacitor. The lead-wire connection on the other hand is preferably not of such a nature as to substantially increase the capacitor size or the problems of capacitor assembly. The construction of the capacitor component is preferably of a simple nature, and the method of assembling the elements of a capacitor should be simple in procedure and economical of labor and material.

It is an object of this invention to provide a solid electrolyte capacitor with a novel cathode and with a novel connection to the cathode.

Another object of this invention is a means for attaching a lead-wire to a cathode that is positioned on a pellet body of a solid electrolyte capacitor.

A further object of this invention is a capacitor assembly tightly secured and sealed within a casing.

These and other objects of this invention will become more apparent upon consideration of the following description taken together with the accompanying drawings in which.

This invention results in a secure attachment of a lead-wire for a solid electrolyte capacitor in contact with a cathode contact that is deposited on the solid electrolyte of the capacitor. An electrode, for example, a cathode, is formed on the pellet type anode of the capacitor and a lead-wire is held and maintained in contact with the cathode electrode and retained in secure contact by a casing and a sealant.

Figure 1:
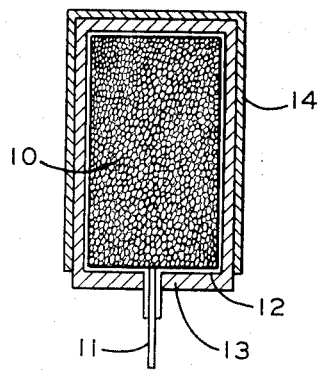
FIG. 1 is a sectional view of an anode pellet sub-assembly of a solid electrolyte capacitor.

A solid lectrolyte capacitor may be constructed around a central anode pellet. In FIG. 1 an anode pellet 10 is shown with a lead-wire 11 attached thereto, and having an oxide coating 12 forming the dielectric layer of the capacitor structure. The dielectric layer 12 encompasses the pellet 10, and the lead-wire 11 extends axially from the generally cylindrical shaped pellet 10. A coating 13 of a suitable solid electrolyte, such as manganese dioxide or lead peroxide, overlies the dielectric oxide layer 12. This coating 13 is closely adherent on the oxide layer 12 and substantially fills the pores of the pellet 10.

It should be understood that the solid electrolyte 13 must not contact the bare metal lead-wire 11; conversely, the lead-wire 11 must be coated with oxide 12 if solid electrolyte 13 is to envelope the entire pellet 10. The resulting sub-assembly is made up of anode pellet 10, dielectric oxide layer 12, and electrolyte coating 13. The anode lead 11 is attached and in electrical contact with the pellet 10. The sub-assembly is ready for the reception of a cathode. In this invention the cathode is a cathode coat 14 applied over the electrolyte coating 13. While the various layers have been shown in the drawing as surface coatings for simplicity and clarity, it should be understood that the anode 10 is of a porous nature and permits the penetration of the succeeding layers into the pores.

Figure 2:
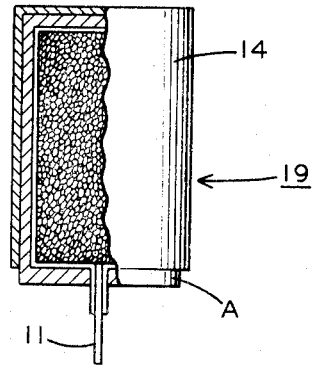
FIG. 2 is a view partially in elevation and partially in section of a sub-assembly for a solid electrolyte capacitor.

As shown in FIG. 2 the cathode coat 14 is superimposed on the coated pellet 10. This cathode coat 14 extends over the outer surface of the electrolyte coating 13 for a substantial part of its total area and from the end opposite the lead 11 to a zone adjacent to but not in contact with the lead 11. Thus, there is left uncoated by the cathode coat 14 an area A of the electrolyte coat 13. The area A serves to insulate the lead 11 from the cathode coat 14.

The cathode coat 14 is preferably a formulation particularly adaptable to the structure of this invention. The cathode coat 14 is adapted for making contact with a cathode lead-wire. For example, an epoxy-silver formulation of 25 parts of epoxy resin and 75 parts of silver flakes stirred thoroughly in the epoxy resin so as to be distributed therethrough provides a satisfactory cathode. The epoxy-silver formulation is stirred and passed through a paint grinding mill to provide satisfactory dispersion of the silver flakes in the epoxy resin. The epoxy resin is made up for application to the pellet body sub-assembly of the capacitor by mixture of the silver-epoxy master batch with a solvent and a hardener for the epoxy. For example, a suitable formulation for coating capacitor pellets has been found in mixing the following ingredients: 10 parts masterbatch; 0.4 parts iminobispropyl-amine (hardener); and 2 parts acetone. This mixture is stirred thoroughly to incorporate the hardener and acetone.

Another suitable cathode material is a mixture of silver flakes in polymerized methyl methacrylate resin. In fact this silver-methacrylate formulation is superior to the silver-epoxy formulation in applications where the series resistance of the capacitors is of a high order of importance. An exceptionally low series resistance (R$x$C) is obtained by a higher silver content (e.g., 90% Ag) in polymerized methyl methacrylate. Therefore it should be understood that the following description of the process and product of this invention is described in terms of a silver-epoxy formulation for illustrative purposes only and should not be considered to be restrictive.

Figure 3:
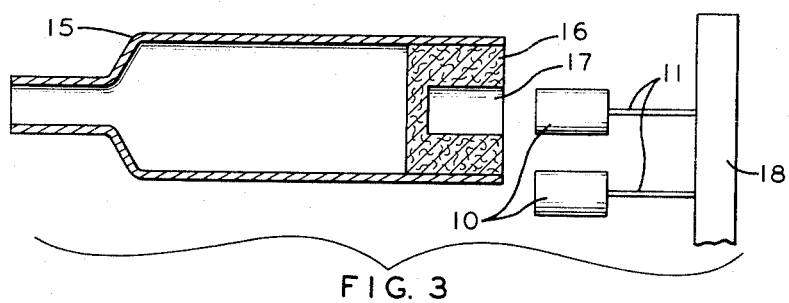
FIG. 3 is a plan view of the apparatus for coating the cathode coat on the pellets.

The epoxy-silver coating is applied to the pellet sub-assembly by any suitable means. One form of apparatus for applying the coat 14 to the solid electrolyte capacitor pellet 10 is shown in FIG. 3 wherein a tube 15 contains in one end a plug 16. The plug 16 in turn is provided with a recess 17 of sufficient size to receive an individual coated pellet 10 inserted therein. Adjacent to the plug 16 and the tube 15 there is shown a rack 18 on which are mounted a group of coated pellets 10. The pellets 10 are secured to the rack 18 by their respective lead-wires 11. The rack 18 is manipulatable to provide the separate and successive insertion of pellets 10 into the recess 17.

In the operation of applying the epoxy-silver formulation to the pellet 10, the coating mixture is suitably dabbed onto that end of the pellet 10 which is removed from lead-wire 11 as mounted on the rack 18. The coated pellet 10 is then inserted into the recess 17 to cause smearing and uniform coating of the epoxy-silver formulation onto the pellet 10. The rack 18 is then moved to withdraw the coated pellet 10 and to insert another pellet 10 for application of the epoxy-silver formulation. In the application of the formulation to the pellets 10, the coat 14 is formed on each pellet 10 as shown in FIG. 2. The insertion of the pellet 10 into the recess 17 takes care of spreading the formulation on the one end and sides of the pellet 10 leaving the lead-wire end uncoated. After application, the coat 14 is cured by heating the coated pellet 10 at 110° C. for one-half hour. The result is a sub-assembly 19 as illustrated in FIG. 2.

The cathode coat 14 after curing is an element permanently attached on the outer surface of the electrolyte coat 13 extending across the outer surface of the coat 13 in the form of a cap. The coat 14 together with pellet 10, layer 12, and coating 13 create a capacitor structure. The coat 14 is so disposed as to ensure an effective and desired capacitance between the anode 10 and the cathode coat 14. At the same time the area A separating the cathode coat 14 from the lead-wire 11 ensures against arcing between the electrodes of the capacitor. Further, this arrangement of the parts lends itself to high speed mass production methods without minimizing the electrical characteristics of the finished product. The area A is of sufficient dimension to ensure a positive separation between the cathode coat 14 and the lead-wire 11 and to accommodate any slopping which might otherwise spoil the electrical isolation between these parts.

The epoxy-silver formulation as applied over the solid electrolyte coat 13 results in a coat 14 which is thin, encompassing, and continuous. This production of the coat 14 also accommodates the capacitor of this invention to high speed manufacturing operations. When the epoxy-silver formulation is spread across the surface of the solid electrolyte coat 13 it rapidly assumes the desired configuration, and thereby forms a satisfactory intimate contact capacitor electrode.

The cathode coat 14 when hardened by curing is receptive to the attachment of a cathode lead. The cathode lead is attached to the sub-assembly 19 by dipping the end of a lead-wire 20 in a supply of the epoxy-silver formulation and applying the dipped end to the cathode coat 14.

Figure 4:
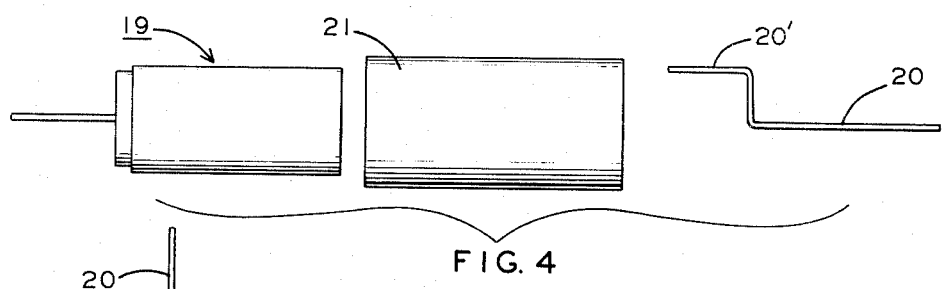
FIG. 4 is an exploded view of a coated pellet and parts for assembly of the completed unit.
Figure 5:
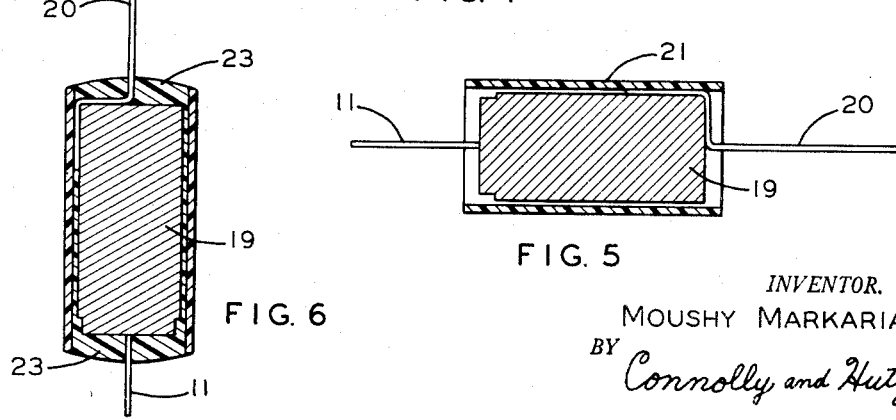
FIG. 5 is a sectional view of the components of FIG. 4 in assembled condition.

The assembly of the sub-assembly 19 with the cathode lead-wire 20 is contained within a casing 21. As seen in FIG. 4 the sub-assembly 19, the cathode lead 20, and the casing 21 are shown in an exploded view. The sub-assembly 19 is at the left of FIG. 4 and the cathode lead 20 is at the right with the sleeve or tube-like casing 21 in the center. The casing 21 is dimensioned to suitably receive the sub-assembly 19 and the lead-wire 20 so that the short terminal portion 20' of the lead 20 will fit between the lateral surface of the coat 14 and the inner surface of the casing 21. This is a close fit, but narrow passages remain along the sides of the sub-assembly 19. The arrangement of sub-assembly 19, casing 21, and lead-wire 20 in assembled condition is illustrated in FIG. 5, wherein the terminal portion 20' of the lead-wire 20 is shown closely fitted between the inner surface of the casing 21 and the side of the sub-assembly 19.

The lead-wire 20 is preferably crooked with two right angle bends so as to make contact with the coat 14 both on the side and around the end of the sub-assembly 19. The bends of the lead-wire 20 forming the terminal portion 20' adapt the lead to rapid assembly of lead-wire 20 and sub-assembly 19 in the casing 21. The terminal portion 20' is preferably flattened to enlarge the contact area to the cathode coat 14. The flattened portion may be curved slightly to conform to the cylindrical contour of the sub-assembly 19.

A coat of silver-epoxy formulation applied to the terminal portion 20' adheres the lead-wire 20 to the lateral surface of sub-assembly 19 and the cathode coat 14 on this lateral surface. The silver-epoxy formulation is applied to the lead-wire 20 preferably by dipping the lead into the formulation. The lead 20 carrying the formulation is attached to the assembly 19 by contacting the portion 20' against the surface of the cathode coat 14 and curing the coat of the formulation on the lead-wire 20 so that it becomes integrated with the coat 14 and firmly bonded thereto. At the same time, the sub-assembly 19 is positioned within the casing 21 and becomes fixed therein by the close fit so as to establish the desired relationship between the capacitance section and the casing. The casing 21 is preferably a section of plastic tubing. While any material of a non-conducting and relatively impervious nature may be employed, it has been found that polyethylene terephthalate is exceptionally well suited for the purposes of this invention.

Figure 6:
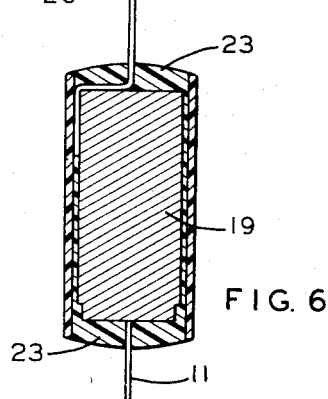
FIG. 6 is a sectional view of a completed device of this invention.

The assembled combination of casing 21 and its contents is cured for a sufficient period to establish a firm bond between lead-wire 20 and cathode coat 14. Curing of the silver-epoxy formulation for one-half hour at 100° C. has been found sufficient to firmly bond the coated sub-assembly 19 and the lead-wire 20 together and result in a locking of these attached parts within the casing 21. A suitable sealant is then filled into the casing 21 such as a non-conducting epoxy resin which fills the ends of the casing 21 as well as the narrow passages within the casing. The resultant finished capacitor is illustrated in FIG. 6 containing an epoxy resin filler 23 as an end seal and sealant.

The above-described embodiment and its method of assembly are subject to modification within the spirit of this invention. For example, the end seal and sealant composition 23 is not limited to an epoxy resin but may be a substance which flows into the casing 21 at a moderate temperature and hardens to a solid substance. The epoxy-silver formulation which has been found to be particularly adapted to the structure of this invention may be substituted by any coating composition which will cover the sub-assembly and provide an adherent, coherent, continuous, conductive coat, and bond a lead-wire thereto.

This invention results in a capacitor which can be made rapidly by a simple operation with foolproof steps which produces a finished component of easily reproducible characteristics. The conventional steps of soldering a lead-wire to the cathode electrode, and masking of the anode pellet for the reception of the cathode coat on the pellet are eliminated. As a result the finished capacitor is economically manufactured and electrically satisfactory.

The features of this invention which are new and useful are covered expressly in the following claims.

What is claimed is:

1. An electrolytic capacitor comprising an anode, a dielectric oxide coating on the surface of said anode, a semiconductive electrolyte coat on said dielectric oxide, a lead joined to and projecting from said anode, a cathode layer in intimate contact with said electrolyte coat and insulated from said anode lead, a cathode lead having a lateral portion in contact with said cathode layer, a conductive resin coating disposed on said cathode layer and over said lateral portion conductively securing said lead to said cathode layer, a plastic sleeve over said conductive resin coating encasing said capacitor, a dielectric resin substantially filling the space between said sleeve and said capacitor securing said sleeve to said capacitor.

2. An electrolytic capacitor as defined in claim 1 wherein said cathode layer and said conductive resin coating are silver-loaded epoxy and said dielectric resin is epoxy.

References Cited by the Examiner

UNITED STATES PATENTS

| | | | |
|---|---|---|---|
| 1,906,691 | 5/33 | Lilienfeld | 317—230 |
| 2,005,279 | 6/35 | Van Geel | 317—230 |
| 2,461,878 | 2/49 | Christensen et al. | 338—352 |
| 2,774,747 | 12/56 | Wolfson et al. | 338—352 |
| 2,869,052 | 1/59 | Ness et al. | 317—230 |
| 2,936,514 | 5/60 | Millard | 317—230 |
| 2,970,182 | 1/61 | Miquels | 317—230 |

FOREIGN PATENTS 160,620    2/54    Australia.

DAVID J. GALVIN, *Primary Examiner.*

SAMUEL BERNSTEIN, GEORGE N. WESTBY,
*Examiners.*